(12) United States Patent
Yu

(10) Patent No.: US 11,169,315 B2
(45) Date of Patent: Nov. 9, 2021

(54) BACKLIGHT MODULE AND DISPLAY DEVICE

(71) Applicant: Wuhan China Star Optoelectronics Technology Co., Ltd., Wuhan (CN)

(72) Inventor: Dongqing Yu, Wuhan (CN)

(73) Assignee: Wuhan China Star Optoelectronics Technology Co., Ltd., Wuhan (CN)

( * ) Notice: Subject to any disclaimer, the term of this patent is extended or adjusted under 35 U.S.C. 154(b) by 100 days.

(21) Appl. No.: 16/625,721

(22) PCT Filed: Oct. 21, 2019

(86) PCT No.: PCT/CN2019/112171
§ 371 (c)(1),
(2) Date: Dec. 22, 2019

(87) PCT Pub. No.: WO2021/017197
PCT Pub. Date: Feb. 4, 2021

(65) Prior Publication Data
US 2021/0231857 A1    Jul. 29, 2021

(30) Foreign Application Priority Data
Jul. 30, 2019    (CN) .......................... 201910697030.5

(51) Int. Cl.
*F21V 8/00*    (2006.01)
(52) U.S. Cl.
CPC ........... *G02B 6/003* (2013.01); *G02B 6/0031* (2013.01); *G02B 6/0053* (2013.01); *G02B 6/0073* (2013.01); *G02B 6/0086* (2013.01)

(58) Field of Classification Search
CPC .... G02B 6/003; G02B 6/0031; G02B 6/0053; G02B 6/0073; G02B 6/0086
See application file for complete search history.

(56) References Cited

U.S. PATENT DOCUMENTS

| 10,527,886 | B1 | 1/2020 | Lin et al. | |
|---|---|---|---|---|
| 2003/0076669 | A1* | 4/2003 | Itoh | G02B 6/0016 362/621 |
| 2004/0161871 | A1* | 8/2004 | Omori | H01L 21/67092 438/68 |
| 2004/0218390 | A1* | 11/2004 | Holman | G02B 17/002 362/245 |
| 2005/0001952 | A1* | 1/2005 | Han | G02B 6/0021 349/65 |

(Continued)

FOREIGN PATENT DOCUMENTS

| CN | 1525219 | 9/2004 |
|---|---|---|
| CN | 201103850 | 8/2008 |

(Continued)

OTHER PUBLICATIONS

Machine Translation of CN 201103850 (Year: 2008).*

*Primary Examiner* — Leah Simone Macchiarolo

(57) ABSTRACT

A backlight module and a display device are provided. The backlight module includes a back plate, a light source layer, a light guide plate, and an optical film. By providing a compensation light structure between backlights, issues of insufficient light at a gap can be better compensated, and an optical performance of the display device can be improved.

10 Claims, 2 Drawing Sheets

(56) References Cited

U.S. PATENT DOCUMENTS

| | | | | |
|---|---|---|---|---|
| 2006/0114372 A1* | 6/2006 | Saito | .................... | G02B 6/0038 |
| | | | | 349/64 |
| 2007/0035967 A1* | 2/2007 | Song | .................... | G02B 6/0031 |
| | | | | 362/609 |
| 2010/0290248 A1* | 11/2010 | Park | .................... | G02B 6/0091 |
| | | | | 362/606 |
| 2014/0063849 A1* | 3/2014 | Chang | ................. | G02B 6/0011 |
| | | | | 362/612 |
| 2014/0340586 A1* | 11/2014 | Terashima | .......... | G02B 6/0031 |
| | | | | 348/790 |
| 2017/0045666 A1* | 2/2017 | Vasylyev | ............ | G02B 6/0018 |
| 2017/0102492 A1 | 4/2017 | Park et al. | | |
| 2020/0355896 A1* | 11/2020 | Woodgate | ................ | G02B 1/14 |

FOREIGN PATENT DOCUMENTS

| CN | 101576228 | 11/2009 |
|---|---|---|
| CN | 108572481 | 9/2018 |
| CN | 109031784 | 12/2018 |
| KR | 10-2011-0073087 | 6/2011 |

\* cited by examiner

BACKLIGHT MODULE AND DISPLAY DEVICE

RELATED APPLICATIONS

This application is a National Phase of PCT Patent Application No. PCT/CN2019/112171 having International filing date of Oct. 21, 2019, which claims the benefit of priority of Chinese Patent Application No. 201910697030.5 filed on Jul. 30, 2019. The contents of the above applications are all incorporated by reference as if fully set forth herein in their entirety.

FIELD AND BACKGROUND OF THE INVENTION

The present disclosure relates to the field of display technologies, and more particularly to a backlight module and a display device.

With the development of display technologies, in current display device designs, display requirements and performance of a screen are becoming higher and higher. As one of important components of a liquid crystal display device, a backlight module provides brightness of a screen of a mobile phone and provides a uniform surface light source, so that a panel can display a normal display image performance.

In module structure designs, an illumination source has a fixed illumination angle, and light of the illumination source has a certain mixing distance. For example, if the distance between a visible area of backlight and a backlight emitting surface is smaller than a light mixing distance of the backlight, there will be hotspot and a poor optical performance. In current designs, a light emitting diode (LED) light bar is composed of a plurality of single packaged lamps, and there is a certain gap between each of the lamps, and such a gap region is a non-light-emitting area of the light bar. The LED light-emitting surface faces a light guide plate (LGP) on a light incident side, and the light is directly incident into the LGP. In a gap area of the LED light bar, that is, the non-light-emitting area, no light can be directly injected into the LGP, which may cause hotspot at a light-emitting port.

Therefore, it is necessary to provide a new backlight module and a display device to improve light accumulation and improve an optical performance.

SUMMARY OF THE INVENTION

The present disclosure provides a backlight module and a display device, by providing a compensation light structure between backlights, issues of insufficient light at a gap can be better compensated, and an optical performance of the display device can be improved.

An embodiment of the present disclosure provides a backlight module. The backlight module includes a light guide plate having a light incident side and a light exit side and a light source layer corresponding to the light incident side of the light guide plate. The light source layer includes at least two light sources and a gap disposed between adjacent light sources. The backlight module further includes a compensation light structure disposed at the gap.

In an embodiment of the present disclosure, the compensation light structure includes at least one semi-convex lens having a curved side and a planar side.

In an embodiment of the present disclosure, the compensation light structure further includes a light transmissive layer disposed at the gap, the planar side of the semi-convex lens is disposed on the light transmissive layer, and the curved side faces the light incident side of the light guide plate.

In an embodiment of the present disclosure, the compensation light structure further includes a reflective layer disposed between adjacent semi-convex lenses and attached to the light transmissive layer.

In an embodiment of the present disclosure, the planar side of the semi-convex lens is disposed on the light incident side of the light guide plate and corresponds to the gap, and the curved side faces the light source layer.

In an embodiment of the present disclosure, the light source layer further includes a light board, and the light sources are uniformly disposed on the light board.

In an embodiment of the present disclosure, each of the light sources is a light emitting diode (LED) lamp bead.

In an embodiment of the present disclosure, the backlight module further includes a back plate disposed on a side of the light guide plate away from the light exit side and an optical film disposed on the light exit side of the light guide plate.

In an embodiment of the present disclosure, the optical film is a prism film.

An embodiment of the present disclosure further provides a display device including the above backlight module.

Beneficial effects of an embodiment of the present disclosure are that, an embodiment of the present disclosure provides a backlight module and a display device. By providing a compensation light structure between backlights, a semi-convex lens is mainly disposed at a gap, and light emitted from a side of the backlight can be collected, and the light is emitted through the semi-convex lens. The light of the backlight at the gap is better transmitted to a light guide plate, so that issues of insufficient light at the gap can be better compensated, and an optical performance of the display device can be improved.

BRIEF DESCRIPTION OF THE SEVERAL VIEWS OF THE DRAWINGS

The accompanying figures to be used in the description of embodiments of the present disclosure or prior art will be described in brief to more clearly illustrate the technical solutions of the embodiments or the prior art. The accompanying figures described below are only part of the embodiments of the present disclosure, from which figures those skilled in the art can derive further figures without making any inventive efforts.

Figure 1:
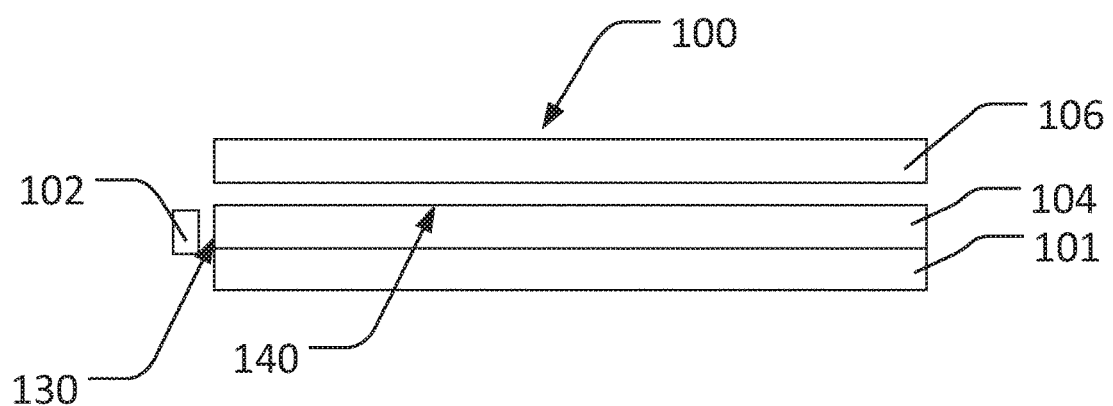
FIG. 1 is a schematic structural diagram of a backlight module according to an embodiment of the present disclosure.

Backlight module 100, 100a; display device 10;
Back plate 101, light source layer 120, 120a; light guide plate 104, 104a;
Optical film 106; light exit side 140; gap 1032, 1032a;
Light board 102; light source 103; compensation light structure 110, 110a;

Light transmissive layer 1101; semi-convex lens 1102, 1102a; reflective layer 1103;

Curved side 111, 111a; planar side 112, 112a; display panel 200;

Light incident side 130, 130a; slope 141, 143; plane 142.

DESCRIPTION OF SPECIFIC EMBODIMENTS OF THE INVENTION

The following description of the various embodiments is provided to illustrate the specific embodiments. Directional terms described by the present disclosure, such as top, bottom, front, back, left, right, inner, outer, side, etc., are only directions by referring to the accompanying drawings. The names of the elements mentioned in the present disclosure, such as first, second, etc., are only distinguishing between different components and can be better expressed. In the drawings, structurally similar elements are denoted by the same reference numerals.

Embodiments of the present disclosure will be described in detail herein with reference to the drawings. The present disclosure may be embodied in many different forms and the present disclosure is not to be construed as being limited to the specific embodiments set forth herein. The embodiments of the present disclosure are provided to explain the practical application of the present disclosure so that those skilled in the art can understand various embodiments of the present disclosure and various modifications suitable for the particular intended application.

Figure 2:
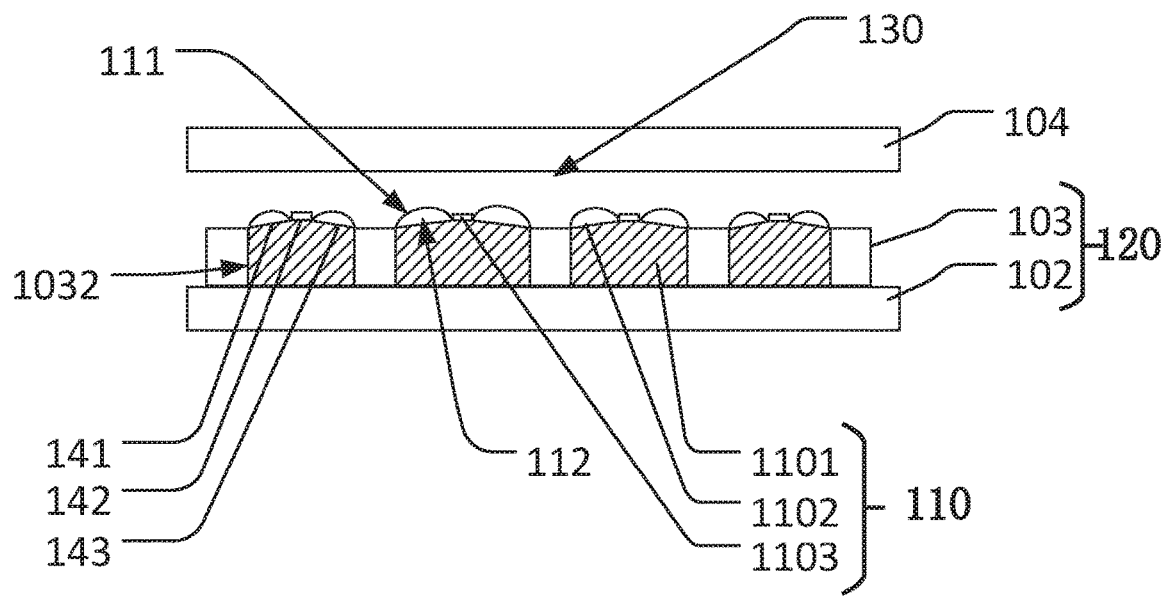
FIG. 2 is a schematic structural diagram of a backlight module according to an embodiment of the present disclosure.

As shown in FIG. 1 and FIG. 2, an embodiment of the present disclosure provides a backlight module 100 including a back plate 101, a light source layer 120, a light guide plate 104, and an optical film 106. The backlight module 100 is a side-entry backlight module.

The light guide plate 104 has a light incident side 130 and a light exit side 140, and the back plate 101 is disposed on a side of the light guide plate 104 away from the light exit side 140.

The light source layer 120 includes a light board 102 and at least two light sources 103. Each of the light sources 103 is a light emitting diode (LED) lamp bead.

The light sources 103 are uniformly disposed on the light board 102. There is a gap 1032 between adjacent light sources 103.

A compensation light structure 110 is provided at the gap 1032. The compensation light structure 110 includes a light transmissive layer 1101, at least one semi-convex lens 1102, and a reflective layer 1103. In the embodiment, each of the compensation light structures 110 is provided with two semi-convex lenses 1102.

The light transmissive layer 1101 is disposed at the gap. The light transmissive layer 1101 is used to support the semi-convex lens 1102 and the reflective layer 1103. The material of the light transmissive layer 1101 comprises a transparent material and has strong light transmissivity.

Specifically, a side of the light transmissive layer facing the light guide plate has at least one slope and a plane. In this embodiment, there are two slopes 141, 143 and a plane 142. The plane 124 is connected to the slope 141 and the slope 143. The slope 141 and the slope 143 are center-symmetrical with respect to the plane 142.

The slope 141 and the slope 143 are respectively provided with a plurality of semi-convex lenses 1102. A number of the semi-convex lenses 1102 on the slope 141 is the same as a number of the semi-convex lenses 1102 on the slope 143. The plane 142 is provided with a reflective layer 1103. The reflective layer 1103 is configured to reflect light to compensate for insufficient light of the semi-convex lenses 1102.

The semi-convex lens 1102 has a curved side 111 and a planar side 112. The planar side 112 of the semi-convex lens 1102 is disposed on the slope of the light transmissive layer 1101, and the curved side 111 faces the light guide plate 104. Since the number of the semi-convex lenses 1102 is not the gist of the invention, there is no limitation on the number of the semi-convex lenses 1102. The semi-convex lens 1102 is used to collect light emitted by the backlight to compensate for insufficient light in the gap, thereby improving optical performance.

The reflective layer 1103 is disposed between adjacent two semi-convex lenses 1102 and attached to a plane on the light transmissive layer 1101. The reflective layer 1103 is configured to reflect the light of a second light emitting side 1032 to complement the light.

The optical film 106 is disposed on the light exit side 140 of the light guide plate 104. The optical film 106 is a prism film.

In an embodiment, by providing the compensation light structure 110 between the adjacent light sources 103, the semi-convex lens 1102 is mainly disposed at the gap 1032, and the light on the second light emitting side can be collected, so that issues of the insufficient light of the gap 1032 can be better compensated and optical performance can be improved.

Figure 3:
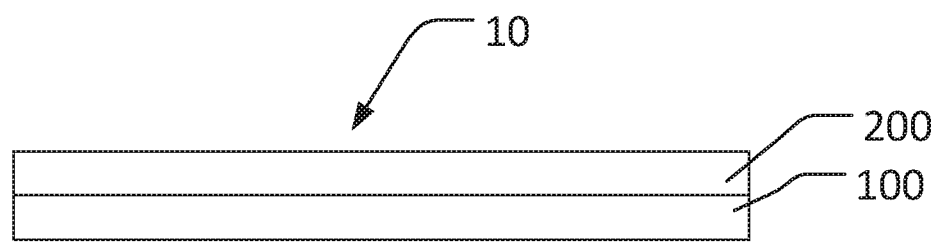
FIG. 3 is a schematic structural diagram of a display device according to an embodiment of the present disclosure.

As shown in FIG. 3, an embodiment of the present disclosure further provides a display device 10 including the above backlight module 100 and a display panel 200.

The display panel 200 is a flexible display panel, and the display panel 200 is disposed on the backlight module 100.

The backlight module 100 includes a compensation light structure 110 at a gap of the light source 103 to compensate for light in the gap, thereby improving optical performance.

The compensation light structure 110 includes a light transmissive layer 1101, at least one semi-convex lens 1102, and a reflective layer 1103. The light transmissive layer 1101 is disposed at the gap and is attached to the second light emitting side 1032. The light transmissive layer 1101 is used to support the semi-convex lens 1102 and the reflective layer 1103. The material of the light transmissive layer 1101 comprises a transparent material and has strong light transmissivity. The semi-convex lens 1102 has a curved side 111 and a planar side 112. The planar side 112 of the semi-convex lens 1102 is disposed on the slope of the light transmissive layer 1101, and the curved side 111 faces the light guide plate 104. Since the number of the semi-convex lenses 1102 is not the gist of the invention, there is no limitation on the number of the semi-convex lenses 1102. The semi-convex lens 1102 is used to collect light emitted by the backlight to compensate for insufficient light in the gap, thereby improving optical performance. The reflective layer 1103 is disposed between adjacent two semi-convex lenses 1102 and attached to a plane on the light transmissive layer 1101. The reflective layer 1103 is configured to reflect the light of a second light emitting side 1032 to complement the light.

Figure 4:
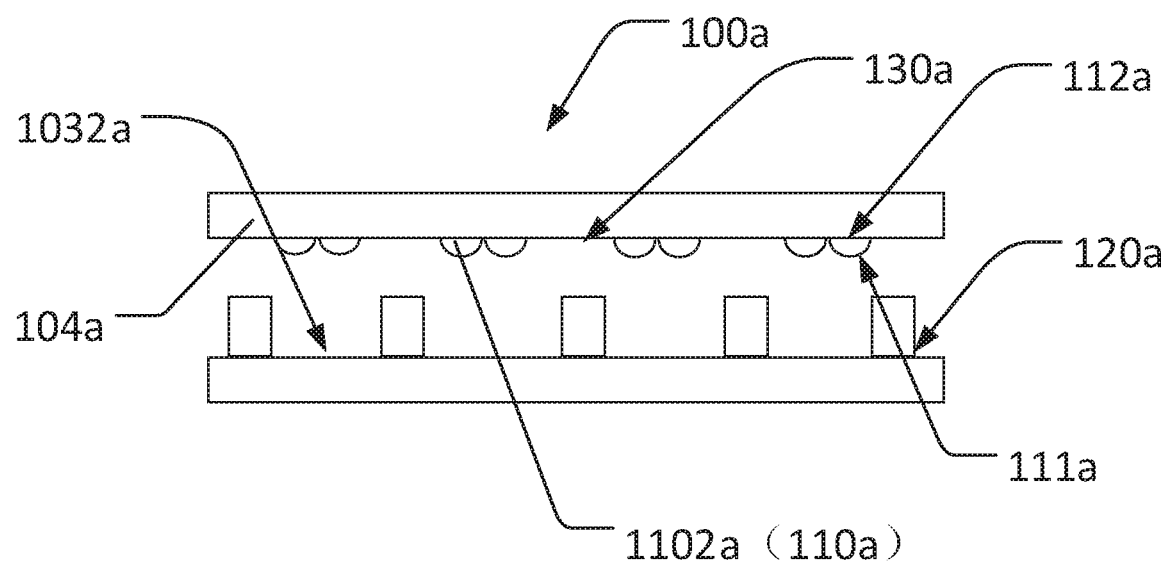
FIG. 4 is a schematic structural diagram of a backlight module according to another embodiment of the present disclosure.

As shown in FIG. 4, another embodiment of the present disclosure provides a backlight module 100a, which is different in that, a compensation light structure 110a includes only a semi-convex lens 1102a, and the semi-convex lens 1102a is disposed at a different position from an embodiment. For example, a planar side 112a of the semi-convex lens 1102a is disposed on a light incident side 130a of a light guide plate 104a and corresponds to a gap 1032a, and a curved side 111a faces a light source layer 120a. A number of semi-convex lens 1102a is not limited and may be plural.

In addition, the present disclosure can also be combined with the embodiment 1 and the embodiment 2, that is, on the basis of the compensation light structure 110 of the embodiment 1, the light incident side 130 of the light guide plate 104 is provided with a semi-convex lens 1102a corresponding to the gap 1032. Light issues of the gap can be better compensated, thereby improving the optical performance.

In summary, although the preferable embodiments of the present disclosure have been disclosed above. It should be noted that those of ordinary skill in the art can make a variety of improvements and substitutions on the premise of not deviating from the technical principle of the present disclosure, and these improvements and substitutions should be encompassed within the protection scope of the present disclosure.

What is claimed is:

1. A backlight module, comprising:
a light guide plate having a light incident side and a light exit side; and
a light source layer corresponding to the light incident side of the light guide plate;
wherein the light source layer comprises at least two light sources and a gap disposed between adjacent light sources; and
wherein the backlight module further comprises a first compensation light structure and a second compensation light structure disposed at the gap, the first compensation light structure further comprises a light transmissive layer disposed at the gap, the first compensation light structure is provided with two first semi-convex lenses, the second compensation light structure is provided with two second semi-convex lenses, a side of the light transmissive layer facing the light guide plate has two slopes and a plane, the plane is connected to the two slopes, the two slopes are center-symmetrical with respect to the plane, the two slopes are respectively provided with the first semi-convex lenses, a number of the first semi-convex lenses on the two slopes is the same, the plane is provided with a reflective layer, each of the second semi-convex lenses has a curved side and a planar side, the planar side of the second semi-convex lens is disposed on the light incident side of the light guide plate and corresponds to the gap, and the curved side of the second semi-convex lens faces the light source layer.

2. The backlight module according to claim 1, wherein a planar side of the first semi-convex lens is disposed on the light transmissive layer, and a curved side of the first semi-convex lens faces the light incident side of the light guide plate.

3. The backlight module according to claim 2, wherein the reflective layer is disposed between adjacent first semi-convex lenses and attached to the light transmissive layer.

4. The backlight module according to claim 1, wherein the light source layer further comprises a light board, and the light sources are uniformly disposed on the light board.

5. The backlight module according to claim 1, wherein each of the light sources is a light emitting diode (LED) lamp bead.

6. The backlight module according to claim 5, further comprising an optical film, wherein the optical film is a prism film.

7. The backlight module according to claim 1, further comprising a back plate disposed on a side of the light guide plate away from the light exit side and an optical film disposed on the light exit side of the light guide plate.

8. A display device comprising a backlight module, wherein the backlight module comprises:
a light guide plate having a light incident side and a light exit side; and
a light source layer corresponding to the light incident side of the light guide plate;
wherein the light source layer comprises at least two light sources and a gap disposed between adjacent light sources; and
wherein the backlight module further comprises a first compensation light structure and a second compensation light structure disposed at the gap, the first compensation light structure further comprises a light transmissive layer disposed at the gap, the first compensation light structure is provided with two first semi-convex lenses, the second compensation light structure is provided with two second semi-convex lenses, a side of the light transmissive layer facing the light guide plate has two slopes and a plane, the plane is connected to the two slopes, the two slopes are center-symmetrical with respect to the plane, the two slopes are respectively provided with the first semi-convex lenses, a number of the first semi-convex lenses on the two slopes is the same, the plane is provided with a reflective layer, each of the second semi-convex lenses has a curved side and a planar side, the planar side of the second semi-convex lens is disposed on the light incident side of the light guide plate and corresponds to the gap, and the curved side of the second semi-convex lens faces the light source layer.

9. The display device according to claim 8, wherein a planar side of the first semi-convex lens is disposed on the light transmissive layer, and a curved side of the first semi-convex lens faces the light incident side of the light guide plate.

10. The display device according to claim 9, wherein the reflective layer is disposed between adjacent first semi-convex lenses and attached to the light transmissive layer.

* * * * *